United States Patent [19]
Hsieh

[11] Patent Number: 5,929,755
[45] Date of Patent: Jul. 27, 1999

[54] PRESSURE GAUGE HAVING AN ENERGY-SAVING SWITCH ASSEMBLY FOR A PRESSURE RESPONSIVE SIGNAL-GENERATING DEVICE

[75] Inventor: Chin-Wei Hsieh, Taipei Hsien, Taiwan

[73] Assignee: Tien-Tsai Huang, Taipei Hsien, Taiwan

[21] Appl. No.: 09/130,744

[22] Filed: Aug. 7, 1998

[30] Foreign Application Priority Data

Jun. 16, 1998 [TW] Taiwan ................................. 87209576

[51] Int. Cl.⁶ .................................................. B60C 23/00
[52] U.S. Cl. ........................ 340/442; 340/445; 340/447; 340/539; 73/146.4; 73/146.5
[58] Field of Search .................... 340/442, 445, 340/447, 511, 539, 693.1, 693.3, 693.4, 693.9; 73/146.5, 146.8, 146.4; 116/34 R

[56] References Cited

U.S. PATENT DOCUMENTS

4,283,706  8/1981  Kimura et al. ........................... 340/442
5,524,034  6/1996  Srygley et al. .......................... 340/447
5,694,111  12/1997  Huang ..................................... 340/442

*Primary Examiner*—Daniel J. Wu
*Attorney, Agent, or Firm*—Ladas & Parry

[57] ABSTRACT

A pressure gauge for a pneumatic tire includes a casing, a pressure responsive signal-generating device disposed in the casing, an electric power source connected electrically to the signal-generating device, and a switch assembly connected electrically to the electric power source. The switch assembly includes a normally open reed switch, a magnet member and a magnet support. The reed switch is electrically connected to the electric power source. The magnet member is disposed movably in the casing to produce a magnetic field for activating the reed switch to an ON position, and is movable toward the reed switch via a centrifugal force produced upon rotation of the pneumatic tire. The magnet support is disposed adjacent to the reed switch to movably hold the magnet member, and has a biasing unit to provide a biasing action to move the magnet member away from the reed switch when the centrifugal force is absent.

6 Claims, 9 Drawing Sheets

PRESSURE GAUGE HAVING AN ENERGY-SAVING SWITCH ASSEMBLY FOR A PRESSURE RESPONSIVE SIGNAL-GENERATING DEVICE

BACKGROUND OF THE INVENTION

1. Field of the Invention

This invention relates to a pressure gauge for a pneumatic tire, more particularly to a pressure gauge having an energy-saving switch assembly for a pressure responsive signal-generating device.

2. Description of the Related Art

U.S. Pat. No. 5,694,111 teaches a pressure gauge of a tire pressure indicator for a set of pneumatic tires, the entire disclosure of which is incorporated herein by reference. The pressure gauge comprises a casing and a pressure responsive signal-generating device disposed in the casing. A power source is connected electrically to the signal-generating device for supplying the electric power required by the signal-generating device. Since the signal-generating device is activated constantly by the power source that includes two lithium button cells or two mercury button cells connected in series, the power will be used up quickly.

SUMMARY OF THE INVENTION

The object of the present invention is to provide a pressure gauge of the aforementioned type in which the pressure responsive signal-generating device can be operated in an energy-efficient manner.

According to the present invention, the pressure gauge for a pneumatic tire comprises a casing adapted to be attached to the pneumatic tire, a pressure responsive signal-generating device disposed in the casing, an electric power source connected electrically to the signal-generating device, and a switch assembly connected electrically to the electric power source. The switch assembly includes a normally open reed switch, a magnet member and a magnet support. The reed switch is electrically connected to the electric power source. The magnet member is disposed movably in the casing to produce a magnetic field for activating the reed switch to an ON position, and is movable toward the reed switch via a centrifugal force produced upon rotation of the pneumatic tire. The magnet support is disposed adjacent to the reed switch to movably hold the magnet member, and has a biasing unit to provide a biasing action to move the magnet member away from the reed switch when the centrifugal force is absent.

The power source is activated when the pneumatic tire reaches a predetermined revolution speed, and is deactivated when the pneumatic tire rotates at a revolution speed lower than the predetermined speed or when the pneumatic tire stops, thereby resulting in efficient energy use.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
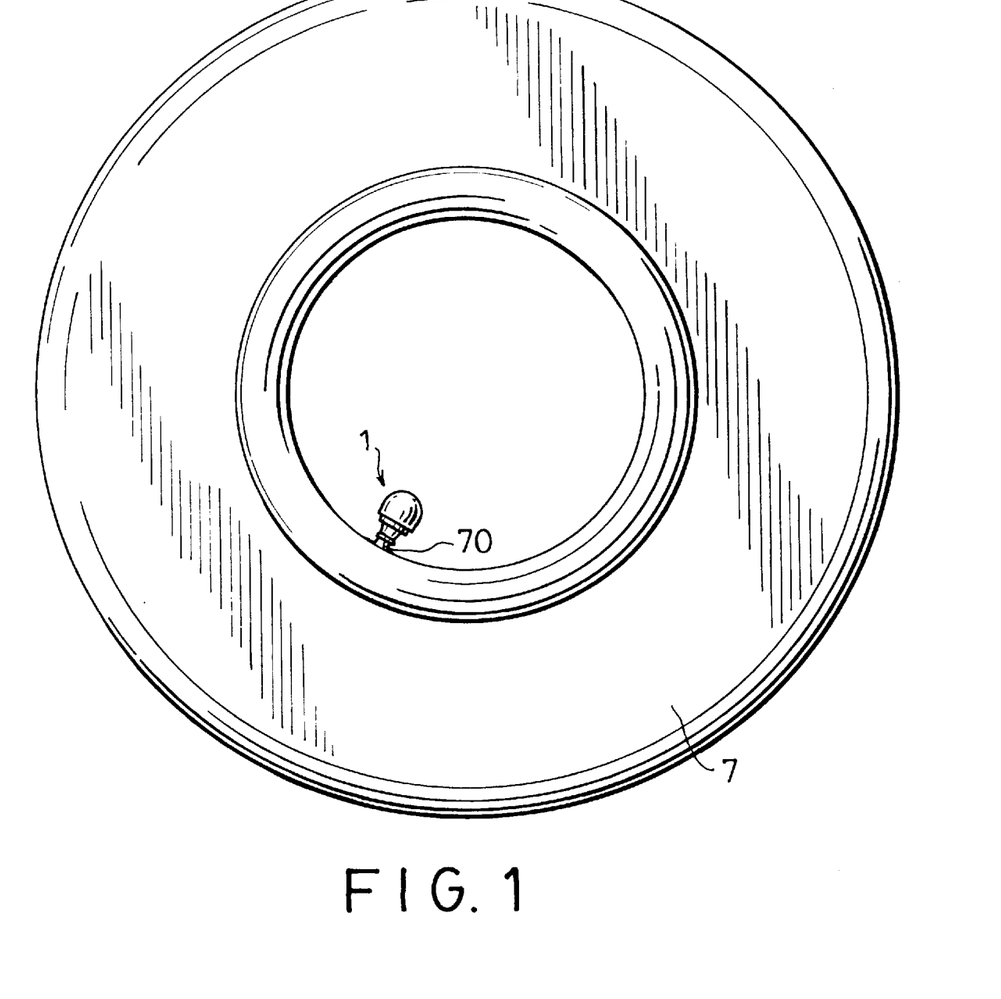
FIG. 1 is a schematic view illustrating how a preferred embodiment of a pressure gauge of the present invention is mounted on a pneumatic tire.
Figure 2:
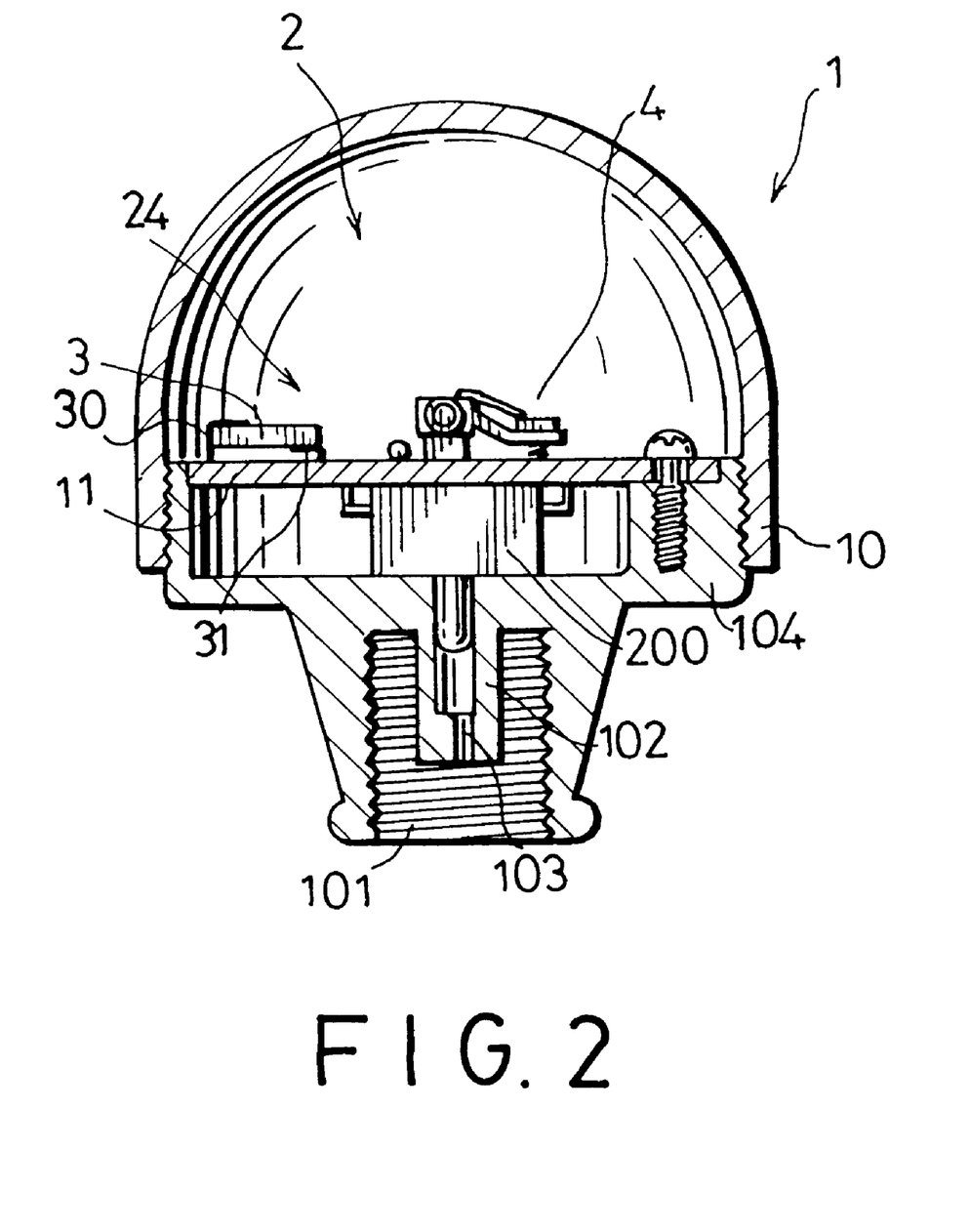
FIG. 2 is a sectional view of the pressure gauge of the preferred embodiment according to the present invention.

Referring to FIGS. 1 and 2, the first preferred embodiment of a pressure gauge 1 for a pneumatic tire 7 according to the present invention is shown to comprise a casing 10, a pressure responsive signal-generating device 2, a power source unit 24 with an electric power source 3, and a switch assembly 4.

The casing 10 has a hollow adaptor 104 with an open end 101 that is connected to an air valve 70 of the pneumatic tire 7. The adaptor 104 is formed with a downwardly extending tubular finger piece 102 to open the air valve 70 when the adaptor 104 is mounted on the tire 7. The finger piece 102 has an inlet 103 formed therein to permit the entry of air from the tire 7 into the hollow adaptor 104.

Figure 3:
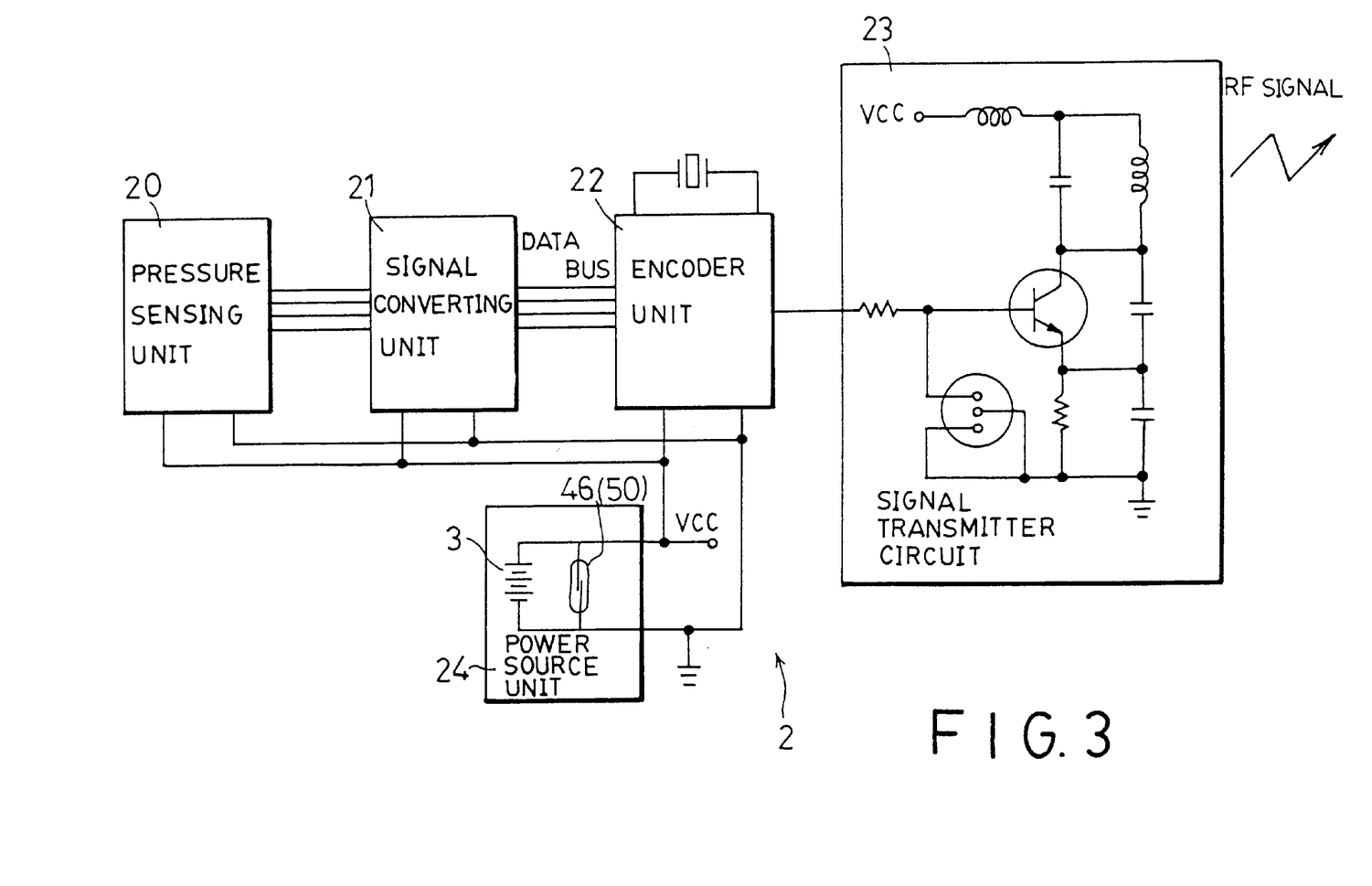
FIG. 3 is a schematic circuit block diagram of a pressure responsive signal-generating device of the pressure gauge shown in FIG. 2.

Referring to FIGS. 2 and 3, the signal-generating device 2 includes a circuit board 11 fastened onto the hollow adaptor 104, a pressure sensing unit 20, a signal converting unit 21, an encoder unit 22 and a signal transmitter circuit 23. The structures and functions of these components of the signal-generating device 2 are similar to those of the signal-generating device in the aforementioned U.S. Patent. The air pressure in the tire 7 is detected by means of a pressure sensor 200 of the pressure sensing unit 20 and is converted into a coded signal by means of the signal converting unit 21 and the encoder unit 22. The coded signal is transmitted wirelessly in the form of a radio frequency (RF) signal via the signal transmitter circuit 23 for reception by a receiver device (not shown) mounted on the instrument panel of the vehicle. The receiver device can thus inform the driver of the vehicle as to whether the tire 7 is under- or over-inflated.

The electric power source 3 includes two lithium button cells or two mercury button cells connected in series, and is connected electrically to the circuit board 11 by two conductive wires 30, 31 in order to supply the electrical power required by the signal-generating device 2.

Figure 4:
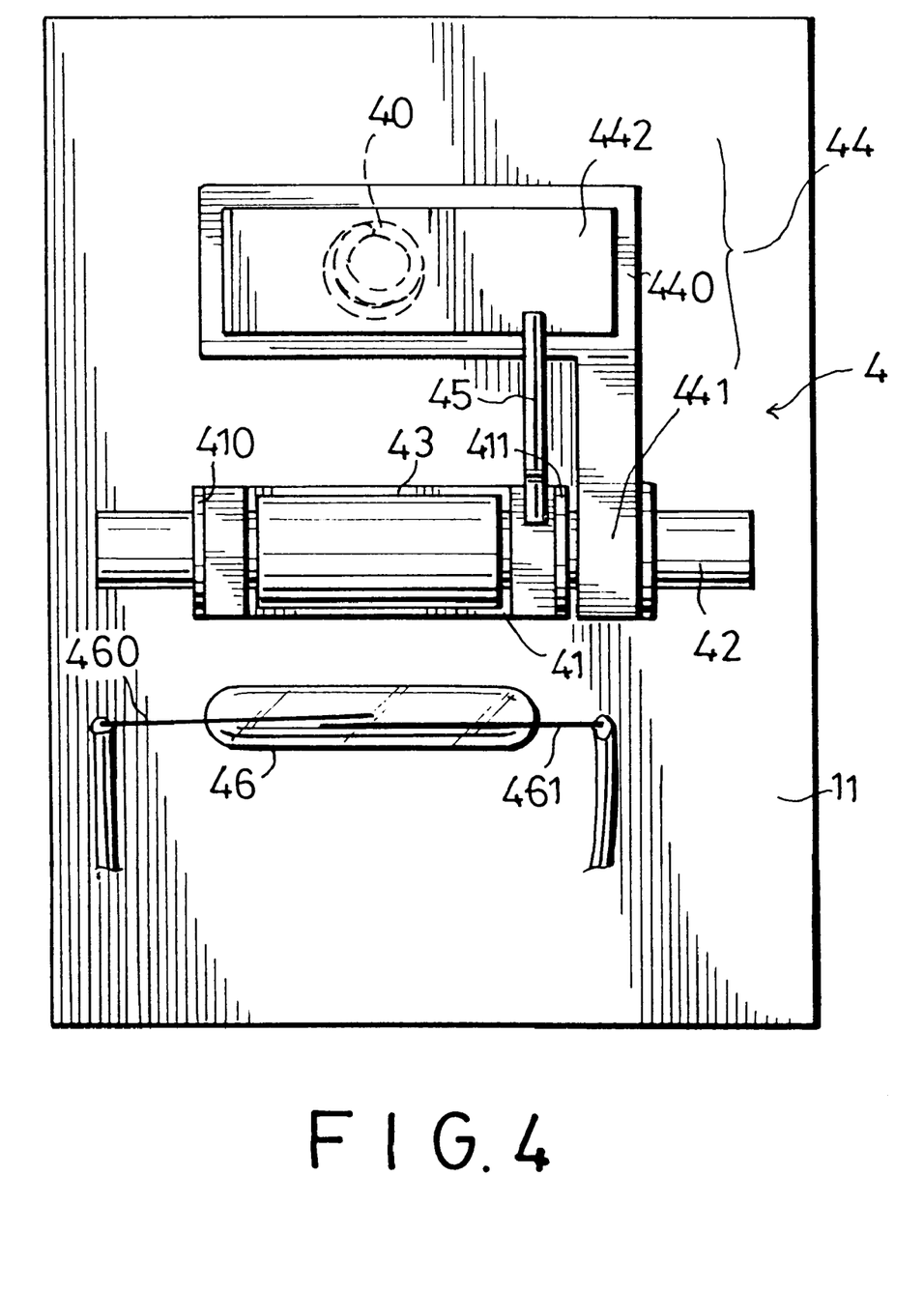
FIG. 4 is a top view of a switch assembly of the pressure gauge shown in FIG. 2.
Figure 5:
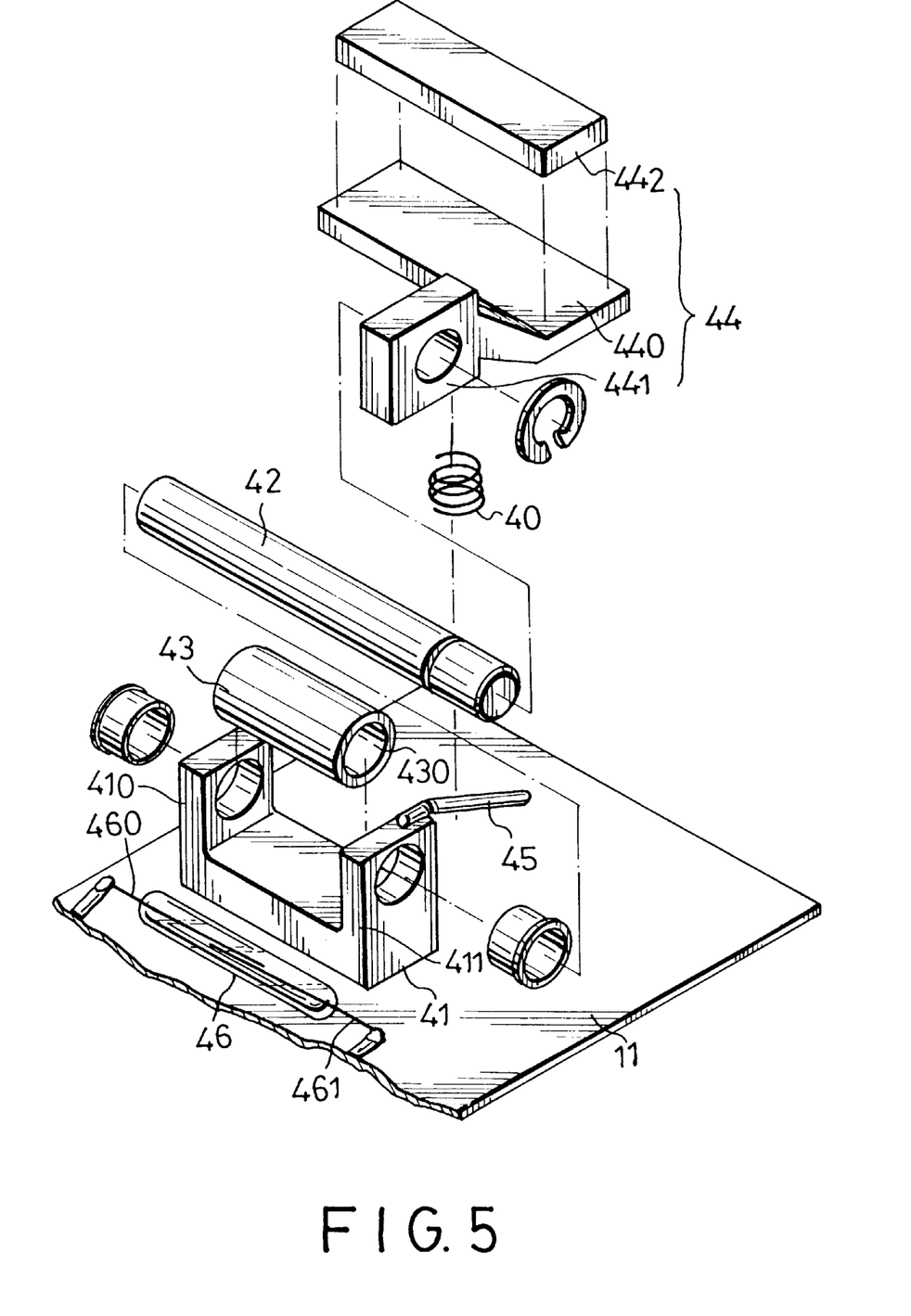
FIG. 5 is a perspective exploded view of the switch shown in FIG. 4.

Referring to FIGS. 4 and 5, the switch assembly 4 includes a normally open reed switch 46, a magnet member 43 and a magnet support that has a biasing unit 40, a U-shaped pivot seat 41, a rotary shaft 42 and a lever 44. The biasing unit 40 is a coiled compression spring that has an end connected to the circuit board 11. The pivot seat 41 has a base fixed to the circuit board 11 between the biasing unit 40 and the reed switch 46, and two upright arms 410, 411. The rotary shaft 42 is journalled to the upright arms 410, 411. The magnet member 43 is formed as a tubular member with an axial through hole 430 for sleeving on the rotary shaft 42, and is made of a magnetizable material. The magnet member 43 is magnetized such that a part of the magnet member 43 that extends axially along the rotary shaft 42 has an external magnetic field. The lever 44 has a first end 441 fixed to the rotary shaft 42 so as to turn the same, and a second end 440 supported by the biasing unit 40. The second end 440 of the lever 44 has a weight 442 fixed thereon and abuts against a stop finger 45 extending from one of the arms 411 so that the magnet member 43 is turnable with the rotary shaft 42 within a predetermined angular distance.

The reed switch 46 is disposed adjacent to the pivot seat 41 and has two contacts 460, 461 that are fixed to the circuit board 11 and that are connected electrically to the power source 3 by means of wires (not shown). When the tire 7 reaches a predetermined revolution speed, a centrifugal force is produced upon rotation of the tire 7 to turn the lever 44 against the biasing force of the biasing unit 40. The rotary shaft 42 with the magnet member 43 is turned so to permit the magnetic field of the magnet member 43 to activate the reed switch 46 to an ON position, thereby enabling the power source 3 to supply electrical power to the signal-generating device 2. On the contrary, when the revolution speed of the tire 7 is lower than the predetermined revolution speed or when the tire 7 stops, the lever 44 is turned back to its original position where the second end 440 of the lever 44 abuts against the stop finger 45 by means of the restoring force of the biasing unit 40. In this state, the reed switch 46 is in an OFF position, thereby deactivating the power source 3. In this way, the electrical power can be conserved, thereby prolonging the service life of the power source 3.

It is noted that the predetermined revolution speed of the tire 7 that activates the reed switch 46 can be varied by employing a biasing unit 40 of different elastic moduli.

Figure 6:
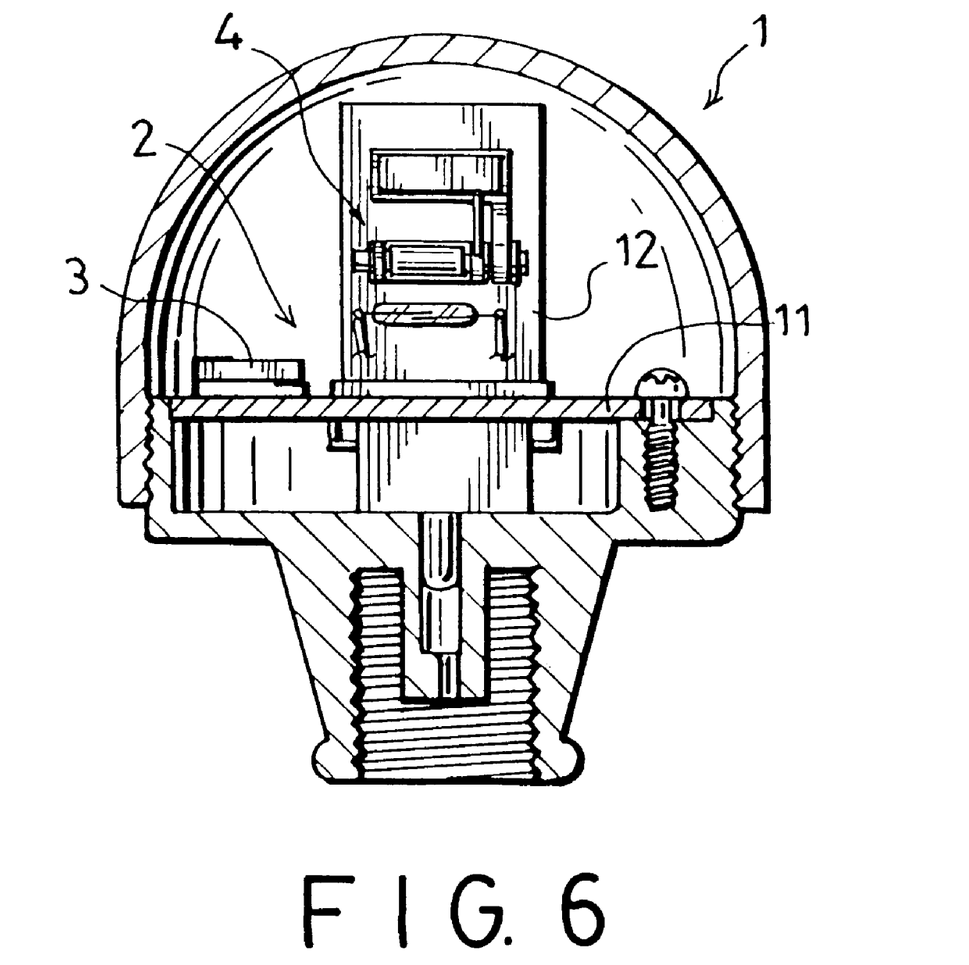
FIG. 6 is sectional view of a modified preferred embodiment of the pressure gauge according to the present invention.

Although the switch assembly 4 and the signal-generating device 2 of the pressure gauge 1 are both mounted to the circuit board 11, the switch assembly 4 and the signal-generating device 2 can be mounted separately on a mounting plate 12 and the circuit board 11 to facilitate the manufacturing process. The mounting plate 12 is fixed perpendicularly to the circuit board 11 with the reed switch 46 connected electrically to the circuit board 11 by wires, as best illustrated in FIG. 6.

Figure 7:
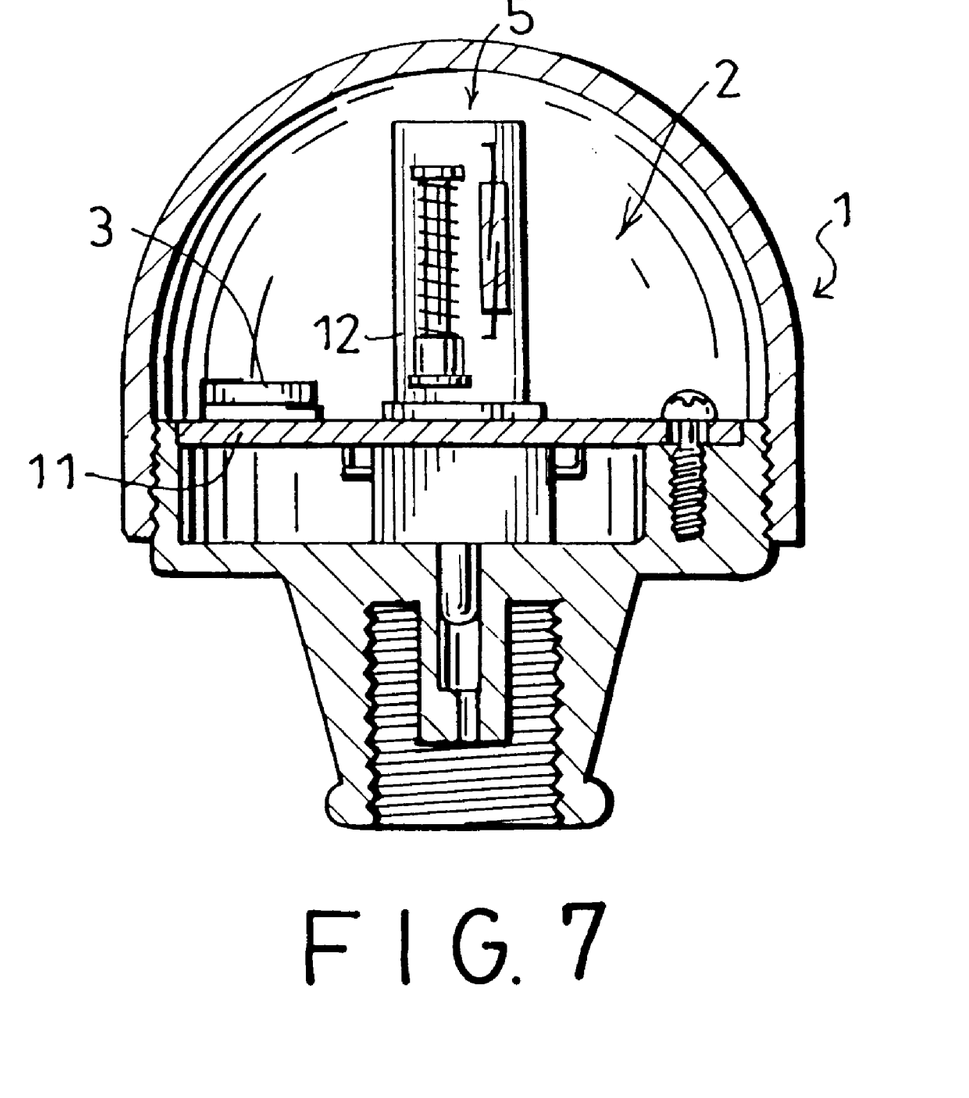
FIG. 7 is a sectional view of a second preferred embodiment of a pressure gauge according to the present invention.
Figure 8:
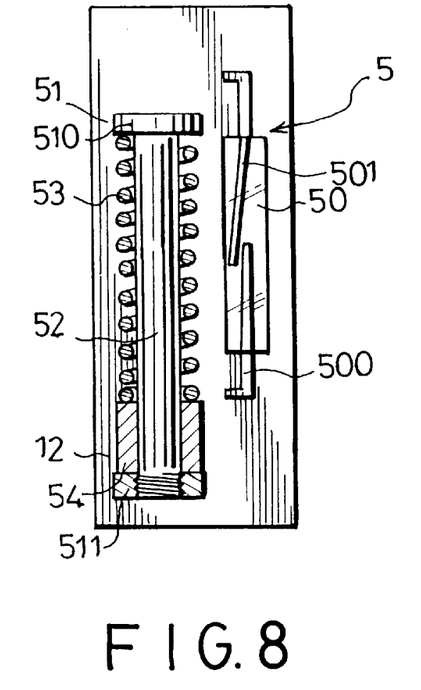
FIG. 8 is a planar, partly sectional view of a switch assembly of the pressure gauge shown in FIG. 7.

Referring to FIGS. 7 and 8, the second preferred embodiment of the pressure gauge 1 according to the present invention is shown to comprise the signal-generating device 2, the power source 3, the circuit board 11, the mounting plate 12 and a switch assembly 5 mounted on the mounting plate 12. In this embodiment, the signal-generating device 2, the power source 3, the circuit board 11 and the mounting plate 12 are similar to those of the previous embodiment. The switch assembly 5 includes a reed switch 50, a magnet member 54 and a magnet support having a mounting seat 51, a stationary shaft 52 and a biasing unit 53.

The reed switch 50 has two contacts 500, 501 welded to the mounting plate 12 and connected electrically to the power source 3. The mounting seat 51 is fixed to the mounting plate 12 and has two spaced posts 510, 511 extending substantially perpendicularly therefrom. The stationary shaft 52 is connected between the spaced posts 510, 511. The magnet member 54 is made of made of a magnetizable material and is magnetized to have an external magnetic field. The magnet member 54 is sleeved slidably on the stationary shaft 52. The biasing unit 53 is a coiled compression spring and is disposed between one of the spaced posts 510 and the magnet member 54 to urge the magnet member 54 to abut against the other post 511 away from the reed switch 50.

When the tire 7 reaches a predetermined revolution speed, a centrifugal force is produced upon rotation of the tire 7 to move the magnet member 54 toward the reed switch 50 against the biasing force of the biasing unit 53, thereby permitting the magnetic field of the magnet member 54 to activate the reed switch 50 to an ON position. In this state, the power source 3 can supply electrical power to the signal-generating device 2. On the contrary, when the revolution speed of the tire 7 is lower than the predetermined revolution speed or when the tire 7 stops, the magnet member 54 is moved back to its original position by means of the restoring force of the biasing unit 53. In this state, the reed switch 50 is in an OFF position, thereby deactivating the power source 3. In this way, the electrical power is conserved, thereby prolonging the service life of the power source 3.

It should be noted that the switch assembly 5 and the signal-generating device 2 can be both mounted on the circuit board 11 instead of being mounted separately on the mounting plate 12 and the circuit board 11.

Figure 9:
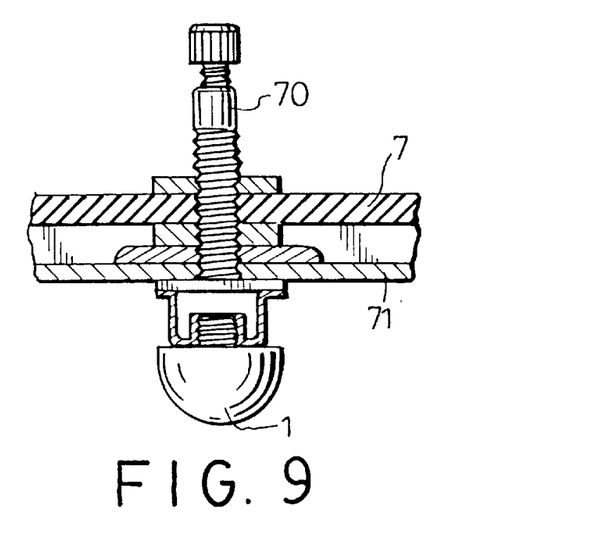
FIG. 9 is a sectional schematic view illustrating how the pressure gauge of this invention is mounted on an inner tube of a pneumatic tire.
Figure 10:
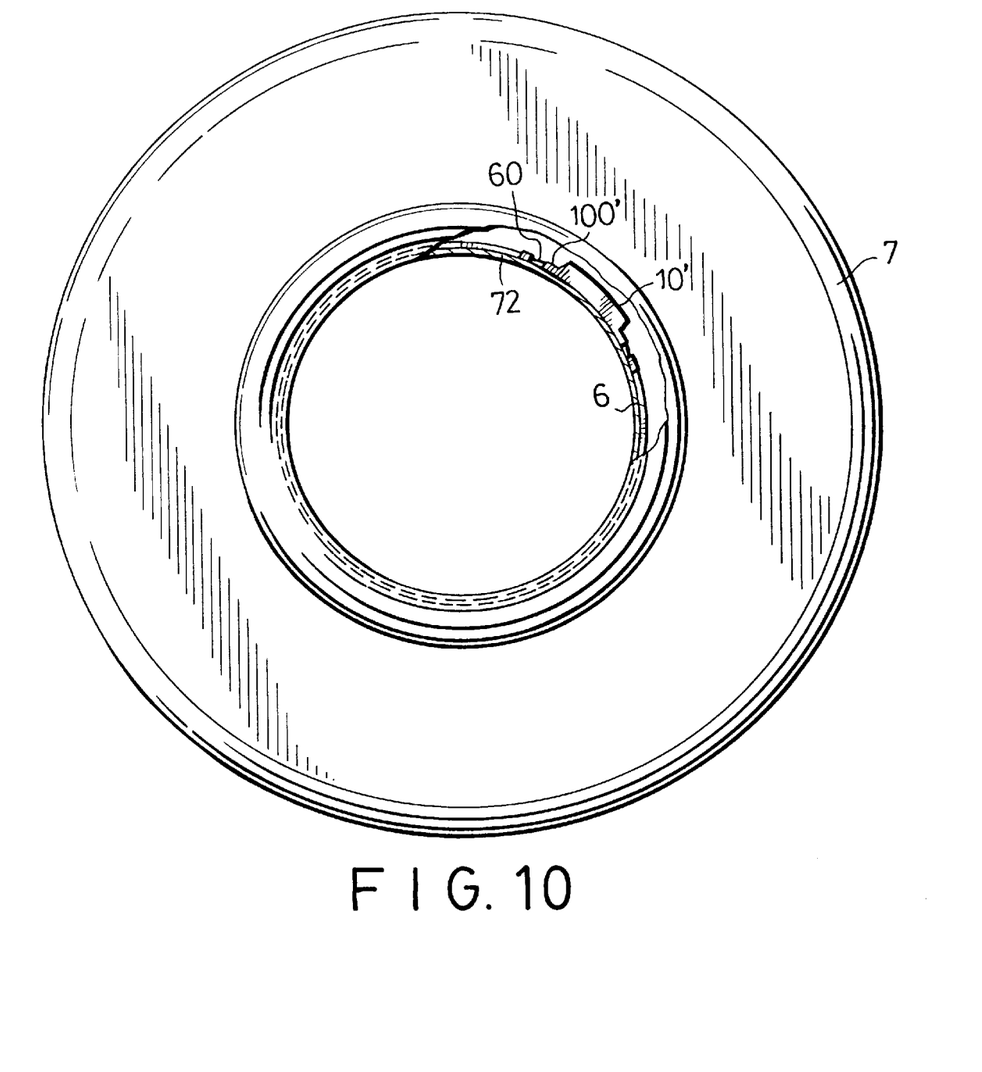
FIG. 10 is a schematic view illustrating how the pressure gauge of this invention is mounted on a steel wheel disc of a pneumatic tire.

Referring to FIG. 9, the pressure gauge 1 of the present invention may be mounted on an inner end of the air valve 70 that extends into the inner tube 71 of the pneumatic tire 7. Moreover, the pressure gauge of the present invention can be modified to have an arcuate casing 10' with two outwardly extending lugs 100'. The casing 10' is fastened to the steel wheel disc 72 of the pneumatic tire 7 by means of a fastening cord 6 with two end hooks 60, as best illustrated in FIG. 10.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A pressure gauge for a pneumatic tire, comprising:
   a casing adapted to be attached to the pneumatic tire;
   a pressure responsive signal-generating device disposed in said casing;
   an electric power source connected electrically to said signal-generating device; and
   a switch assembly connected electrically to said electric power source, said switch assembly including:
   a normally open reed switch electrically connected to said electric power source;
   a magnet member disposed movably in said casing to produce a magnetic field for activating said reed switch to an ON position and movable toward said reed switch via a centrifugal force produced upon rotation of the pneumatic tire; and
   a magnet support disposed adjacent to said reed switch to movably hold said magnet member and having a biasing unit to provide a biasing action to thereby move said magnet member away from said reed switch when the centrifugal force is absent.

2. The pressure gauge as defined in claim 1, wherein said magnet support comprises a rotary shaft and a lever, said lever having a first end fixed to said rotary shaft so as to turn said rotary shaft and a second end supported by said biasing unit, said magnet member extending axially on said rotary shaft and being turnable with said rotary shaft within a predetermined angular distance.

3. The pressure gauge as defined in claim 2, wherein said casing has a circuit board on which said magnet support is mounted.

4. The pressure gauge as defined in claim 2, wherein said casing has a circuit board fixed therein and a mounting plate fixed to said circuit board, said mounting plate having said switch assembly mounted thereon.

5. The pressure gauge as defined in claim 4, wherein said magnet support comprises a mounting seat fixed to said mounting plate, two spaced posts extending substantially perpendicularly from said mounting plate and a stationary shaft connected between said spaced posts, said magnet member being mounted slidably on said stationary shaft, said biasing unit being disposed between one of said spaced posts and said magnet member to urge said magnet member to move away from said reed switch.

6. The pressure gauge as defined in claim 1, wherein the centrifugal force is produced when the pneumatic tire reaches a predetermined revolution speed.

\* \* \* \* \*